1. 1 x .75
2. 1 x 1.5
3. 3 x .75
4. 1 x .75 + 3 x .75
5. 1 x .37 + 3 x .38 + 10 x .37 + 30 x .38

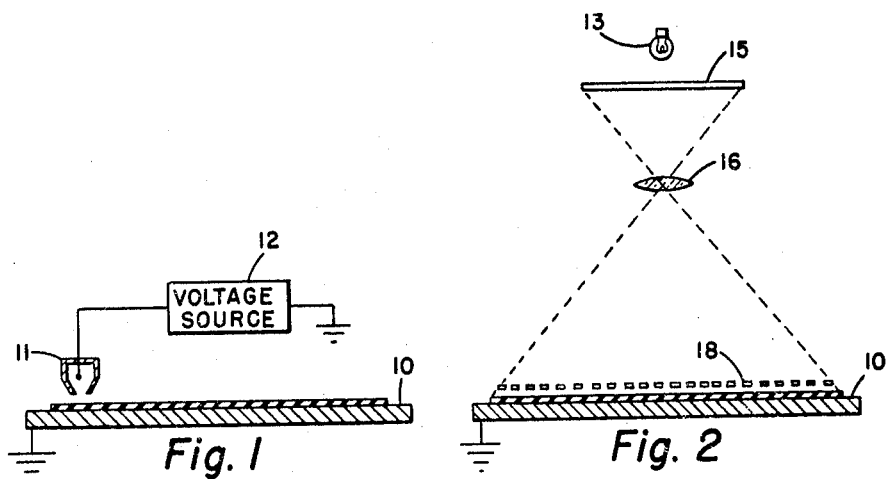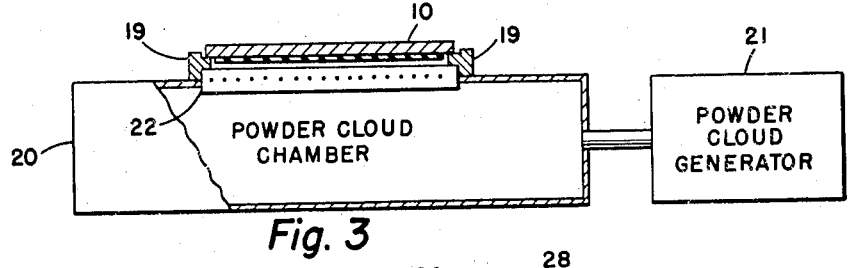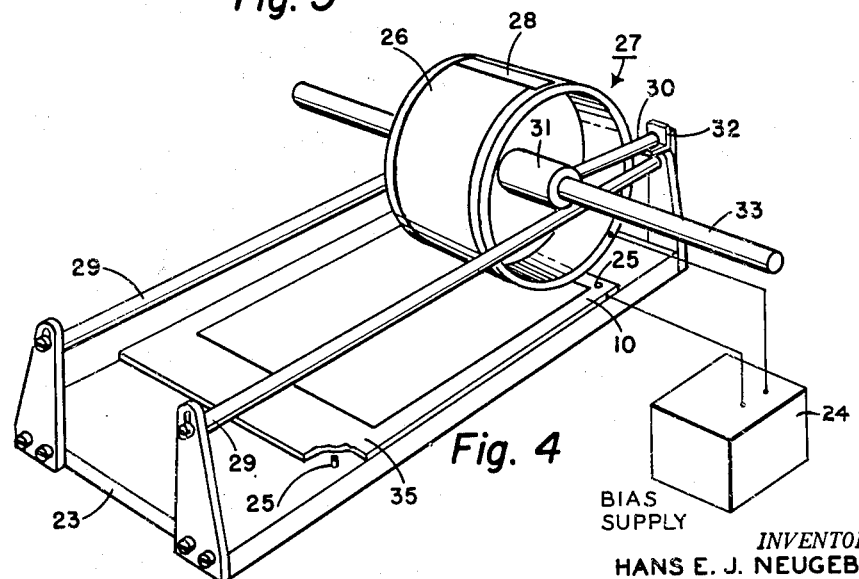

1 x .75 + 30 x .75

INVENTOR.
HANS E. J. NEUGEBAUER
ROBERT W. GUNDLACH
BY
Stanley Z Cole
ATTORNEY () # United States Patent Office 3,212,889
Patented Oct. 19, 1965

3,212,889
XEROGRAPHIC CONTRAST CONTROL
Robert W. Gundlach, Victor, and Hans E. J. Neugebauer, Webster, N.Y., assignors to Xerox Corporation, Rochester, N.Y., a corporation of New York
Filed June 12, 1961, Ser. No. 126,400
7 Claims. (Cl. 96—1)

This invention relates to xerography and, in particular, to control of contrast in xerographic image reproduction.

In xerography, it has been possible to produce excellent reproductions of line copy. With more refined techniques, it has also been possible to reproduce images containing solid areas in several different shades. However, it has been heretofore difficult to reproduce the full latitude of contrast that has been possible in photography and is desirable in all types of reproductions from continuous-tone originals. Thus, in a conventional xerographic reproduction process it is possible to reproduce images showing highlights. It has also been possible to reproduce images by a xerographic process showing shadows. But to reproduce images xerographically with contrast differentiation for both highlights and shadows has required complex equipment and extremely sensitive controls during processing.

Now in accordance with the present invention, it is disclosed that xerographic images can be formed and developed showing density differentiation corresponding to differentiations in the original. Also in accordance with the present invention, it has been found that images can be formed in accordance with any one of a large variety of characteristic curves to produce a final image of a desired contrast. A simple and highly flexible contrast control techinique is disclosed and utilized in this invention. Thus it is an object of the invention to define methods and means of controlling contrast in xerographic reproduction.

It is a further object of the invention to define an improved process for making reproductions of continuous-tone images xerographically.

It is a still further object of the invention to define methods for improving the contrast latitude in xerographically reproduced images.

Further objects and features of the invention will become apparent while reading the following description in connection with the drawings wherein:

FIG. 1 is a diagrammatic illustration of plate charging;

FIG. 2 is a diagrammatic illustration of xerographic exposure;

FIG. 3 is a diagrammatic illustration of xerographic development;

FIG. 4 is a perspective view of a xerographic image transfer device;

FIGS. 1 through 4 are simplified diagrams showing embodiments for basic apparatus of reproducing xerographic images with contrast control in accordance with the invention. These embodiments while basic in nature necessarily include specific features which are not to be interpreted as limiting but are intended to include the various usual alternatives for performing similar functions.

Figure 5:
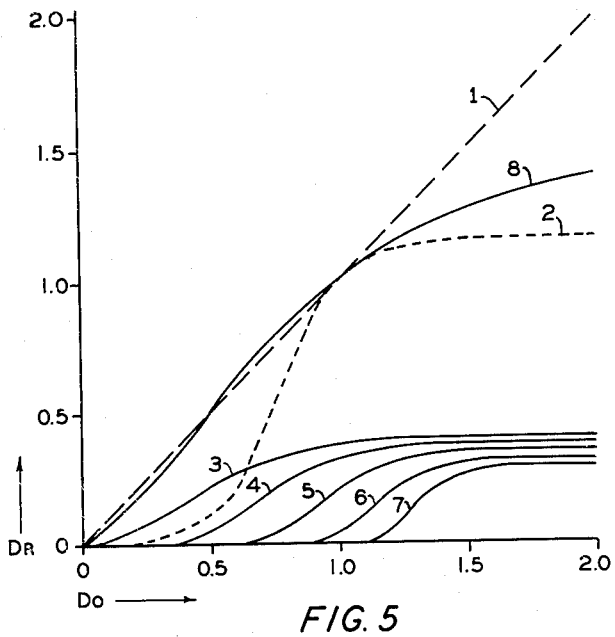
FIG. 5 is a graphical illustration of a series of curves of reproduced image density versus original image density.

In FIG. 1 xerographic plate 10 is charged by electrostatic charging device 11 energized by voltage source 12 so that an electrostatic potential level is produced on the surface of plate 10 between approximately 100 and 900 volts. The particular voltage employed depends on many factors generally known to those skilled in the art. Thus, if continuous tones are to be developed using powder cloud development systems, preferably a voltage of about 150 to 200 is placed on the plate. This voltage is chosen to give adequate image density while maintaining a wide density range. Higher voltages increase density but decrease "gray scale" range. However, if a half tone electrostatic image is formed and cascade development in used, a potential level of between about 500 and 600 volts is generally preferred. It should be appreciated, however, that other voltages may be used depending, for example, on the plate and other factors known to those skilled in the art. Xerographic plate 10 is a usual photosensitive member used in xerographic reproductions and conventionally comprises a conductive backing or support coated with a photoconductive insulating material. An example of such a plate is described in U.S. Patent 2,970,906. Charging device 11 is depicted as a corona discharge device but is intended to include any form of an electrostatic charging device capable of producing the desired charge uniformity and level. Similarly, although charging is illustrated in this figure, it is intended to merely accomplish sensitization of the plate and this may be done in any of the ways known to those skilled in the art, including employing mechanism during the exposure step described in connection with FIG. 2 and omitting a separate charging step as illustrated in this figure.

In FIG. 2 the sensitized xerographic plate 10 is exposed to an illumination pattern produced by illumination of an original 15 to be reproduced by source 13 depicted as an incandescent bulb but including any source of illumination to which the xerographic plate used is sensitive. Illumination of plate 10 in accordance with image original 15 is made through lens 16. In this embodiment and in the interest of complete disclosure half-tone screen 18 is shown in the path of illumination. As will appear more clearly below, such a screen is not necessary in all embodiments of this invention. Image 15 may be any image to be reproduced and while illustrated as a transparency, it is intended to include opaque originals from which an illumination pattern can be reflected. It should be appreciated that while any image can be reproduced in accordance with the present invention, since continuous-tone originals are the most difficult to xerographically reproduce according to the present state of the art and since a great demand for such type reproductions exist and because the instant invention can attain the critical requirements of the market for contrast control and latitude, the invention is primarily directed to reproducing continuous-tone originals. Half-tone screen 18 when employed may be a dot screen but is preferably a line screen of between 50 to 400 lines per inch, and in one embodiment the screen has about 120 lines per inch. An appropriate screen is a 50–50 screen of black and clear lines. The screen serves the purpose of forming a repeating uniform pattern of voltage gradients across the plate, tending to prevent the various developed-image distortions that appear in large continuous areas of a xerographic reproduction when known controls such as a development electrode are not employed during the development step. Screen 18 may appropriately be positioned directly on the photosensitive surface or spaced slightly therefrom.

Where a half-tone technique is used in the exposure step, it is possible to obtain negative reproductions from positive originals or positive reproductions from positive originals or other arrangement as desired depending upon the way in which a screen is used. Thus, if as illustrated in FIG. 2, a screen is positioned between the original and the sensitive plate during exposure, a positive original will produce a negative reproduction. Under the same conditions a negative original will produce a positive reproduction. The same result will transpire whether the original is a transparency that is projected or is an opaque original from which the image is reflected onto the sensitive plate. Other arrangements to form half-tones are disclosed from fully in U.S. Patents 8,598,732 and 2,599,-542. For example, if the sensitive plate is exposed to a screen image prior to exposure to the original being reproduced, then a negative original will produce a negative reproduction and a positive original will produce a positive reproduction. Likewise, when a half-tone characteristic is inherent in the sensitive plate, a negative reproduction will be produced by a negative original and a positive reproduction will be produced by a positive original. In situations, as will be further described below, where a development electrode is used in the development step, and where no screen is used in the original exposure, the relation of the original to the reproduced image will depend on whether charged or uncharged area development is used. Uncharged area development using a development material attracted to the areas of low voltage will develop out areas receiving relatively great illumination and charged area development in which the development material is attracted to the areas of higher voltage will develop out areas receiving relatively less illumination.

In the case of half-tone originals, if an adequate screen tone appears, an additional screen during exposure will be unnecessary.

After exposure in accordance with FIG. 2 development of the exposed plate 10 is performed by any known xerographic development procedure such as cascade development in which electroscopic particles are cascaded across the electrostatic latent image on the xerographic plate, liquid development in which a liquid carrying a suspension of electroscopic particles is presented to the surface carrying the electrostatic latent image, transfer development in which a sheet carrying a layer of electroscopic particles is placed in contact with the electrostatic latent image, or by other appropriate methods including magnetic developmment or powder cloud development which is illustrated in FIG. 3.

As shown in FIG. 3, in powder cloud development the latent image-bearing plate 10 is placed on support 19 adjacent to an opening in a powder cloud chamber 20. Powder cloud generator 21 supplies an aerosol of fine electroscopic particles into powder cloud chamber 20 from which the aerosol cloud is presented to the latent image on xerographic plate 10. A development electrode 22 comprising a wire screen, a screen of perforated sheet metal, or other development electrode configuration, is positioned in close proximity to the xerographic plate so that the electroscopic particles are fed through openings in the electrode to the plate surface. If no screen is used for the exposure, a development electrode serves to develop larger areas of relatively uniform density. If the image is broken up into fine dots or lines by a half-tone technique, the development electrode may be dispensed with. The electroscopic particles are any usual xerographic developing powder such as a resin blend xerographic toner as disclosed in Rheinfrank, U.S. Patent 2,788,288. Following development the developed image is transferred and, as will appear more fully below, transfer of a plurality of developed images is accomplished in register a plurality of times to the transfer sheet and therefore it is desirable that means to accomplish accurate registration be built into the system. Such mechanism is described in connection with FIG. 4.

FIG. 4 shows a device depicted in some detail for better understanding but intended to represent an embodiment of a transfer device capable of achieving the required registration accurately in consecutive transfers. In this device developed plate 10 is placed on base 23 having at least two register pins 25. Notches or holes are contained in plate 10 corresponding with register pins 25 to enable accurate positioning of plate 10 on base 23. Transfer is accomplished in this invention to a transfer sheet 26 which is fastened tautly and securely to metal cylinder 27. The transfer sheet is stretched tautly on the cylinder and fastened to the cylinder by a pressure sensitive tape 28 or other suitable fastening means such as hooks or clamps to assure registration during consecutive transfers. As illustrated in FIG. 4, transfer cylinder 27 is restricted from lateral movement by guide rails 29 and has a positioning pin 30 attached to axial support portion 31 of the transfer cylinder for accurate positioning with respect to plate 10. In operation, plate 10 is placed in engagement with register pins 25 and transfer cylinder 27 is disposed between guide rails 29 and in a position exactly engaging positioning pin stop 32 with positioning pin 30. The transfer sheet on the cylinder is then rolled across and in contact with plate 10 by means of axle 33. In the preferred embodiment, conductive backing 35 of plate 10 is electrically connected to metal transfer cylinder 27 by bias supply 24 and is otherwise insulated therefrom. Bias supply 24 is adjusted to provide electrical conditions suitable for transfer. While the transfer method described above is preferred with a transfer and registration device of the type illustrated in FIG. 4, other conventional xerographic transfer methods can be used. For example, if a latent image on plate 10 was developed with a negative polarity toner, then placing a transfer sheet over the developed image and applying a positive charge to the back of the transfer sheet will induce a transfer. Such a positive charge may be applied conveniently with, for example, a corona discharge device such as used for plate sensitizing in accordance with the embodiment of FIG. 1. More efficient transfers may be obtained by applying an electrostatic charge of one polarity on the developed image as by passing a corona discharge device over it, placing the transfer sheet on top of the developed image and then applying an electrostatic charge of the opposite polarity to the side of the transfer sheet away from the image.

In a xerographic reproduction process according to the invention, xerographic plate 10 is charged, exposed to an image with a given magnitude of exposure, developed and transferred to transfer sheet 26. Then any residual image from that transfer is cleaned from plate 10 and plate 10 is again sensitized as in FIG. 1 and re-exposed to the same image in register with a different magnitude of exposure as, for example, doubling the length of exposure time, developed as in FIG. 3 and transferred in register onto the previously transferred image. This process may be repeated forming and transferring images in register for any desired number of times using selective magnitudes of exposure in each cycle in order to obtain any desired contrast characteristics as will be further explained below. It is preferable in each repetition of the copying cycle to rotate the line screen if used 30 degrees or more but rotation is not necessary to obtain improved results over the presently expected results in the art. Rotation of the screen serves several purposes. It fills in the lines to a certain extent so that the final reproduced image appears continuous, and it also separates the partial images formed by each reproduction cycle, so that individual contrast characteristics of each partial image are brought out more fully in the final reproduction. If the line screen is rotated less than 30 degrees, moiré effects may show up due to interference between the lines of the individual partial images. Although there is illustrated powder cloud development in the drawing, considerable experimentation has been carried out with cascade techniques of development. Cascade development is popular in this art because of its dependability and simplicity. It does not require bulky equipment and does not require critical control as is the case with most other developing procedures. Further, when exposure is made employing a screen, a development electrode is not necessary during development and, although cascade development has become popular due to its typical contrasty development, by following the procedures described, one achieves a continuous tone appearing reproduction. Further improved results are obtained if in addition to normal and commercially used cascade development steps a final single cycle partial image is obtained and transferred by developing with developer material of positive polarity characteristics and developer material of negative polarity characteristics as disclosed in application entitled Xerography, Serial No. 116,429, filed in the name of Hans E. J. Neugebauer, the same date as the present application. The final reproduction when such steps are followed has wide contrast latitude and more effectively reproduces the deep density areas of the original being reproduced. The techniques of employing this developer as described in the above-mentioned co-filed application is incorporated herein by reference.

As is usual in xerographic reproductions, the reproduced image is preferably "fixed" by some process to cause better adherence to the transfer sheet and eliminate "smudging" of the image. Fixing is customarily accomplished by treating the image so that the developer material is at least partially melted or dissolved. The developer material hardens with a strong bond to the transfer sheet. For fixing, the image can be exposed to a solvent vapor which in the case of a resin toner may be trichloroethylene, benzene or other resin solvent or it can be exposed to heat radiation as from an infra-red element or other electric heating element. For use in the present invention, fixing may be accomplished in one step after all partial image transfers have been made in register or each partial image transfer may be separately fixed. The former is considered preferable due to the reduction of process steps.

Operation of the present invention is best understood by referring to the graph shown in FIG. 5. In this graph $D_o$ represents the density of the original image given in density units from 0 to 2. $D_r$ represents the density of the reproduced image in density units. The dashed line 1 on the graph shows what the ideal reproduction would be while the dotted curve 2 is typical of a single cycle xerographic reproduction. Examining curve 2 shows that the reproduced image fails to differentiate the more dense areas of the original above about 1.2 and differentiation is likewise poor in reproduction of the very low density areas of the original below about .4. Curves 3, 4, 5, 6 and 7 are typical xerographic reproductions using a 50–50 line screen as described above and with exposure times of 3 seconds, 6 seconds, 12 seconds, 24 seconds, and 48 seconds, respectively. Curve 3 in the graph shows that reproduced differentiation of low density areas of the original is best in a low magnitude exposure. Curves 4, 5, 6 and 7 show that as the exposure magnitude is increased, differentiation is brought out corresponding to the more and more dense areas of the original image. It will be noted that the maximum density in each of these curves is between .2 and .4 density unit. This maximum density limitation may be imposed by a line screen. It may be advantageous, in addition, to use a grey toner instead of a black one for the cycles of low exposure that serve to reproduce highlight. Use of a grey toner is necessary when powder cloud development is used with a development electrode and without a half-tone screen unless certain controls are built in during development as through biasing the electrode to accomplish particular results during development. When images are reproduced according to each of these exposure magnitudes and transferred onto a single transfer sheet, in register, the resulting reproduction shows an additive effect so that the final reproduced image corresponds typically to curve 8. As can be seen, curve 8 is a considerable improvement over curve 2, although it is still somewhat difficient in the maximum density areas. A further transfer in register of an image developed with the two polarity development procedures, as mentioned above, will greatly improve the final image in areas of maximum density.

As can readily be understood by examining the curves in the figure, it is possible to obtain a final image contrast characteristics that varies in any desired way from the original. Suitable selection of screens, exposure magnitudes and developers of different characteritsics may produce any desired control of contrast in the reproduction.

Figure 6:
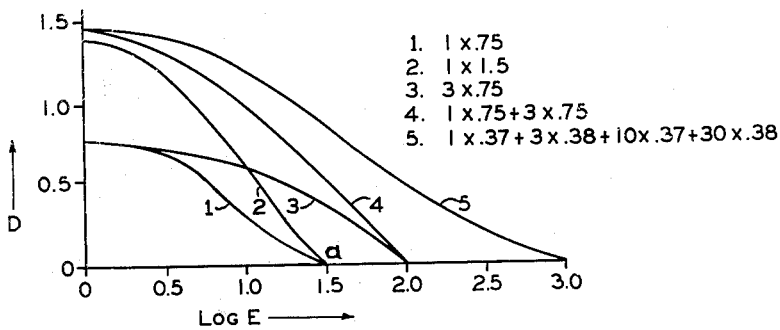
FIG. 6 is a graphical illustration of a series of density versus exposure curves obtainable in accordance with the invention; and, FIG. 7 is a graphical illustration of a density versus exposure curve having a particular non-linear characteristic.

FIG. 6 shows a series of curves which further illustrate the flexibility of contrast control in accordance with the present invention. Thus, in FIG. 6, E is defined as exposure or the magnitude of illumination received by a discrete area of a sensitive xerographic plate and is conventionally given in logarithmic units. D is defined as density or the opacity to light produced in a transparent layer by developing an exposed discrete area of the xerographic plate and transferring it to the transparent layer. Curves 1 through 5 vary according to the exposure time using a constant source of illumination to project an image pattern. The curves also are affected by the maximum density obtainable in a single image development by the particular development material or toner used. Curve 1 is characteristic for a given arbitrary time 1 of exposure using a toner with a maximum single image density of .75 density unit. Curve 2 is characteristic for time 1 using a toner with a maximum single image density of 1.5. Curve 3 is characteristic when using the same toner as used in curve 1 but with three times the exposure time. The point at which curve 3 touches the exposure magnitude axis is shifted 0.5 unit to the right of the point at which curve 1 touches the exposure magnitude axis in accordance with the logarithmic scale used, as log 3~0.5.

Curves 4 and 5 are characteristic for combined images as indicated in the legends for the figures. In these legends the first number in each set of two numbers indicates the exposure time as related to time 1 and the second number indicates the maximum density obtainable in a single or partial image with the particular developer. As illustrated in the figures, exposure time 1 produces a maximum exposure magnitude indicated as "a" on the log E scale. While as it is shown in the figures the single or partial images add nearly arithmetically to produce the combined curves, the relationships are not linear and particular combinations given were chosen for simplicity to remain close to arithmetic conditions. Nor will the given curves hold true when the images are added on an opaque transfer sheet where the image density is measured by reflection characteristics rather than transmission characteristics. Nevertheless, the same principles apply and similar advantages can be derived in the formation of either reflective or transmissive image reproductions.

Curve 2 in the figure is typical of a xerographic reproduction. Curve 4 shows the improvement that may be obtained by combining two images formed in accordance with curves 1 and 3. Curve 5 shows a still further increased contrast latitude that may be obtained with a combination of four partial images.

Figure 7:
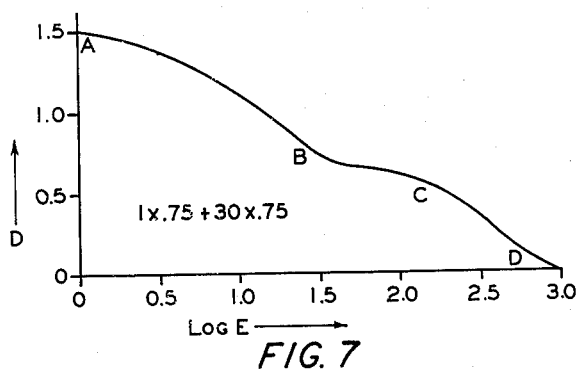

FIG. 7 has been included to show a non-linear characteristic curve that can be obtained by combining two partial images. Such a curve can be useful in producing color masks with particular non-linear characteristics to compensate for color deviations in color reproductions.

While many variations are possible to obtain good contrast latitude in a xerographically reproduced image, the following combinations are mentioned merely for illustrative purposes. It should be appreciated, however, that good results were obtained using commercially available xerographic equipment and supplies and that some variations from the data should be expected due to original contrast, desired contrast to be reproduced, developers, etc. Cascade development was used and exposure was made to a continuous-tone original after first exposing a sensitive plate to line tone screen. In one case each of the second and third exposures was about 2½ times the magnitude of the first exposure and each of the fourth and fifth exposures was about three times the magnitude of the second or third exposure. In each cycle of the process the sensitized xerographic plate was first preexposed to a line screen with the line screen rotated 30 degrees counterclockwise as related to the position of the previous cycle. After all the transfers were made in register, the final combined reproduction was fused with trichloroethylene vapor. All the exposures were made with a 2:1 reduction in size and the line tone screen had 60 lines to an inch so that the reproduced image showed barely visible lines of 120 to an inch. The resulting image showed very good contrast latitude. However, the maximum density in the reproduction did not truly conform to the maximum density of the original. In other reproductions using the development technique of the aforementioned co-filed application, deep densities did conform with the original. In addition, experiments have also produced reproductions in which the screen pattern cannot be seen at all.

In other experiments four partial images were produced using exposure time of 3, 10, 20 and 30 seconds, respectively. Partial images were transferred in register and fixed with trichloroethylene vapor. Impressive reproductions resulted.

Contrast control in accordance with the present invention, besides improving the quality of reproduction in a xerographic process, has particular value in reproducing images where it is desired to emphasize contrast in particular density ranges of the original. Examples of this are in the masking of masks for color correction and in bringing out detail when reproducing small sections of a photograph or other original containing large areas of detail with wide variations in density between one and another area, such as might be encountered in an aerial photograph.

While the present invention has been described as carried out in specific embodiments thereof, there is no desire to be limited thereby but it is intended to describe the invention broadly within the spirit and scope of the appended claims.

What is claimed is:

1. The method of xerographic reproduction comprising the steps of sensitizing a xerographic surface, exposing said surface to a light pattern of an original image for a given magnitude of exposure to form a latent image, developing said latent image with a particulate pigmented material, transferring the image so developed to a transfer sheet, and repeating each step of the process using a different magnitude of exposure of the same original image in its same spectral composition and tonal relationships and transferring each subsequent development in superimposed register to the previously transferred image on the same transfer sheet so that a composite reproduced pattern is obtained.

2. The method of contrast-controlled xerographic image reproduction of an original image having image areas of different density ranges comprising performing the following cycle at least twice with regard to the same original image in its same spectral composition and tonal relationships, the cycle comprising the steps of xerographically forming a developed xerographic image of said original on a support surface and transferring the developed image to a transfer member, at least each of two of said cycles including forming a developed image differing from a developed image formed from another of said cycles by having a density range corresponding to a different density range in said same original, and each transfer being carried out in register so that all transfers subsequent to the first transfer place the images superimposed on the last transferred image.

3. The method according to claim 2 in which said cycle is performed at least four times and each of said cycles includes forming a developed half-tone image corresponding to a different density range in said original.

4. The method according to claim 2 in which the final cycle includes forming a developed image with cascade developing material responsive to positive electrical charges and cascade developing material responsive to negative electrical charges.

5. The method of reproducing an original image having image areas of different density ranges comprising a plurality of process cycles relative to the same original image in its same spectral composition and tonal relationships in which each cycle comprises the steps of sensitizing a xerographic plate, exposing said plate to a light pattern of the original image to produce a latent electrostatic reproduction of said image on said plate, cascading pigmented electroscopic particles over the latent electrostatic reproduction to form a developed reproduction of said image and transferring said developed reproduction to a transfer sheet in superimposed register with developed reproductions transferred in preceding cycles of said plurality of process cycles, said plurality of process cycles including at least one cycle in which the magnitude of exposure is such as to produce greatest contrast from the highlights of the original image and including at least one cycle in which the magnitude of exposure is such as to produce greatest contrast from the shadows of the original image.

6. The method of claim 5 including fixing the images after completion of all of said cycles by exposing the images to vapors which are a solvent for said particles.

7. The method of xerographic reproduction comprising sensitizing a xerographic surface, exposing said surface to a light pattern through a line-tone screen for a given magnitude of exposure to form a latent image, developing said latent image with a particulate pigmented material, transferring the image so developed to a transfer sheet, and repeating each step of the process with the line-tone screen rotated about 30 degrees and using a different magnitude of exposure, and transferring in register to the same transfer sheet so that a composite reproduced pattern is obtained.

References Cited by the Examiner

UNITED STATES PATENTS

| | | | |
|---|---|---|---|
| 506,109 | 10/93 | Gerland et al. | 96—45 |
| 1,954,097 | 4/34 | Powers | 96—45 |
| 2,297,691 | 10/42 | Carlson | 96—1 |
| 2,343,586 | 3/44 | Schufftan | 96—45 |
| 2,532,701 | 12/50 | Falconer | 96—45 |
| 2,598,732 | 6/52 | Walkup | 96—1 |
| 2,808,328 | 10/57 | Jacob | 96—1 |
| 2,868,642 | 1/59 | Hayford | 96—1 |
| 2,986,466 | 5/61 | Kaprelian. | |
| 3,010,842 | 11/61 | Ricker | 262—62.1 |
| 3,013,892 | 12/61 | Bixby | 262—62.1 |

OTHER REFERENCES

RCA, Australian Abst. 59,252/60, Oct. 13, 1960.

NORMAN G. TORCHIN, *Primary Examiner*.

HAROLD N. BURSTEIN, *Examiner*.